No. 804,421. PATENTED NOV. 14, 1905.
G. W. MARBLE & W. R. DONALDSON.
VARIABLE SPEED TRANSMISSION FOR VEHICLES.
APPLICATION FILED DEC. 7, 1904.
2 SHEETS—SHEET 1.
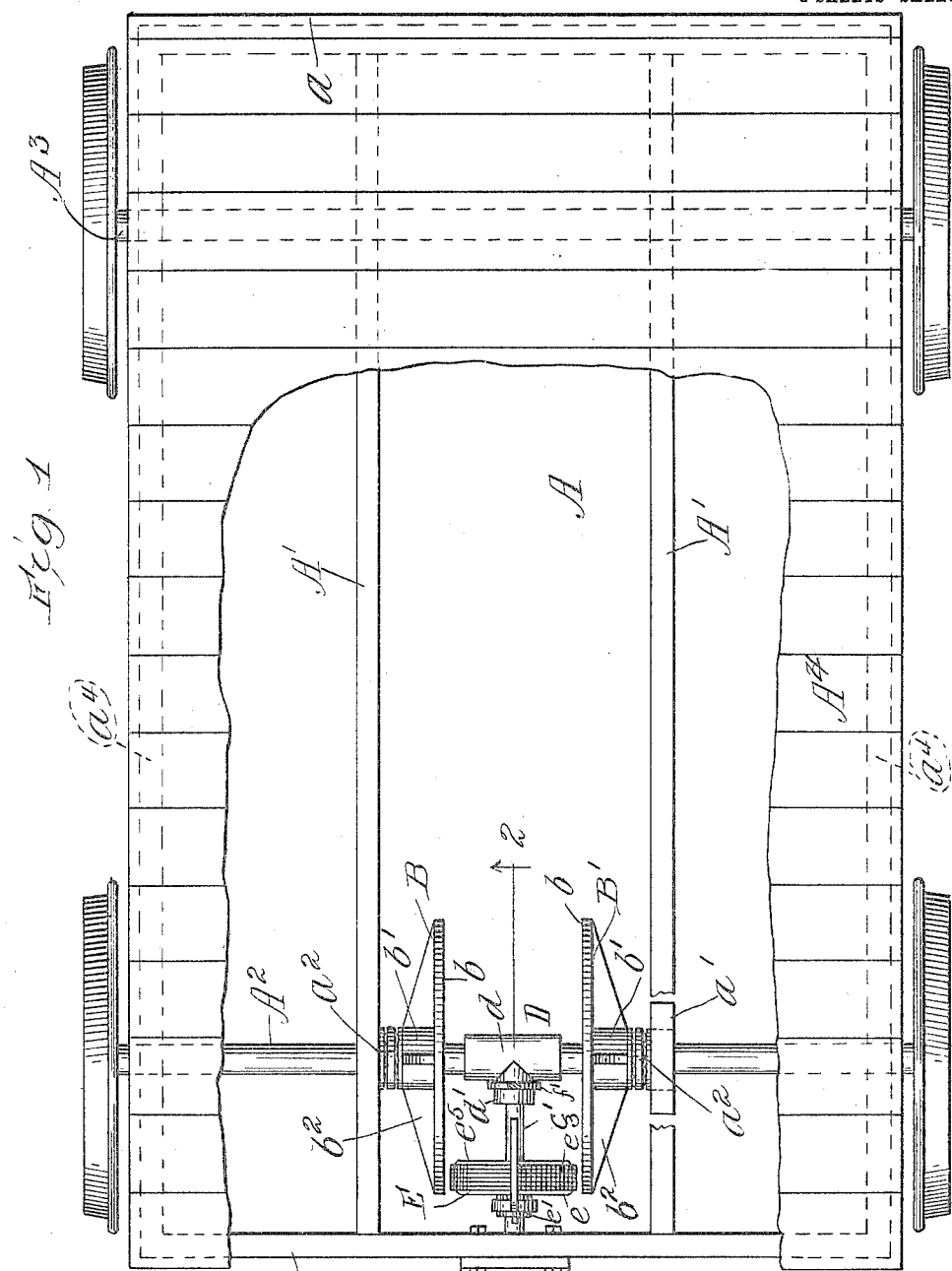

No. 804,421. PATENTED NOV. 14, 1905.
G. W. MARBLE & W. R. DONALDSON.
VARIABLE SPEED TRANSMISSION FOR VEHICLES.
APPLICATION FILED DEC. 7, 1904.
2 SHEETS—SHEET 2.
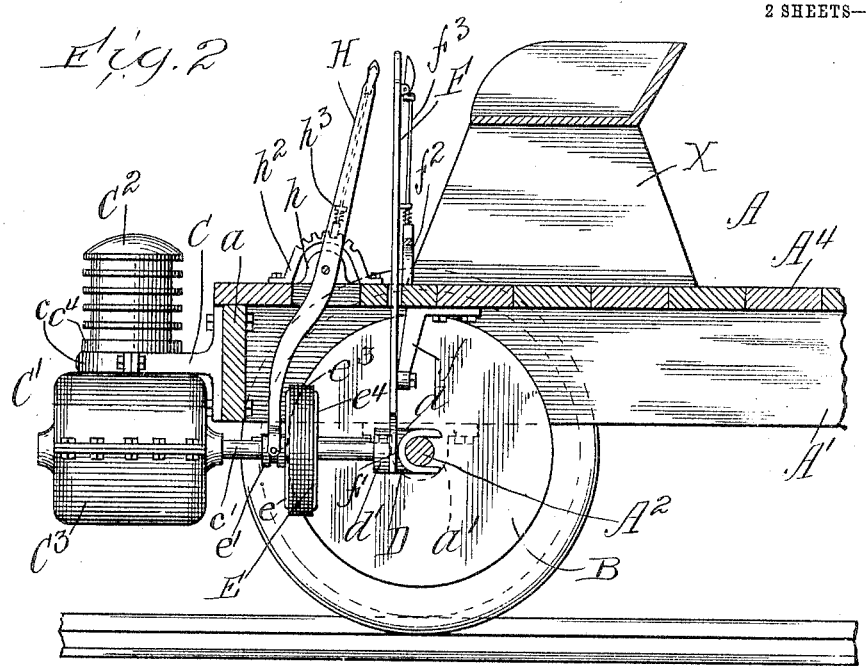
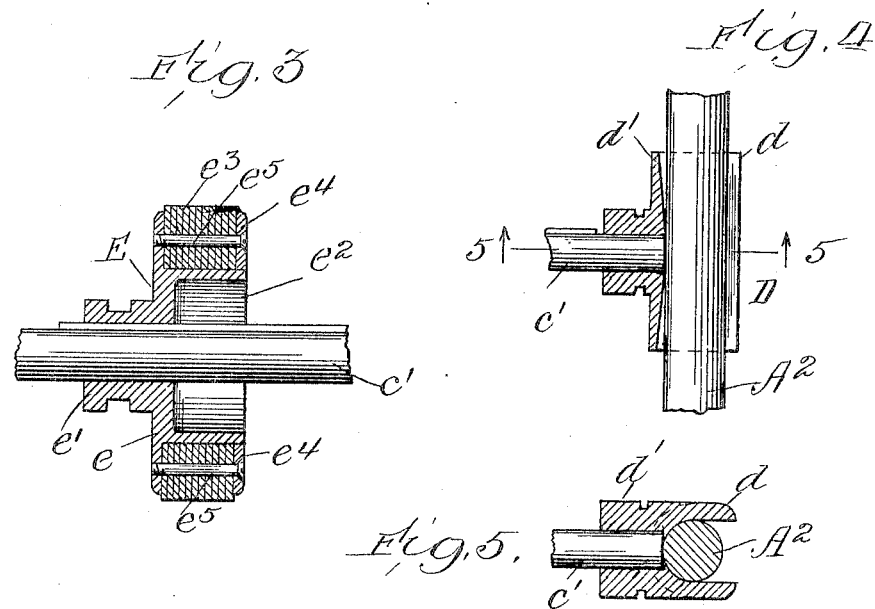

UNITED STATES PATENT OFFICE.

GEORGE W. MARBLE AND WILLIAM R. DONALDSON, OF CHICAGO, ILLINOIS.

VARIABLE-SPEED TRANSMISSION FOR VEHICLES.

No. 804,421.          Specification of Letters Patent.          Patented Nov. 14, 1905.

Application filed December 7, 1904. Serial No. 235,908.

*To all whom it may concern:*

Be it known that we, GEORGE W. MARBLE and WILLIAM R. DONALDSON, citizens of the United States, and residents of the city of Chicago, in the county of Cook and State of Illinois, have invented certain new and useful Improvements in Variable-Speed-Transmission Mechanism for Vehicles; and we do hereby declare that the following is a full, clear, and exact description of the same, reference being had to the accompanying drawings, and to the characters of reference marked thereon, which form a part of this specification.

This invention relates to improvements in variable-speed-transmission mechanism for vehicles, and more particularly to speed transmission and controlling devices adapted for use with a constant-speed motor of any kind. As shown, the invention is embodied in a track-inspection car, though obviously it may be embodied in many other classes of vehicles or machines.

Heretofore track-inspection cars, though sometimes driven by constant-speed motors, such as an explosive-engine, have usually been provided with geared speed-transmission devices of such a complicated nature as to render them objectionable. The use to which such cars are put necessitates frequent variations of speed from one extreme to the other within short distances and also very frequent starting, stopping, and reversing, all of which cause a great strain on the driving mechanism.

The object of this invention is to provide a very simple yet positively-acting, strong, and durable speed-transmission device for any and all purposes, but which in the present instance is shown embodied in an inspection-car driven by an internal-combustion engine, the power of which, by means of said transmission device, is transmitted perfectly to the running-gear of the car or vehicle without shock or jar.

It is also an object of the invention to provide a speed-transmission device whereby the car can be driven with equal speed in either direction and which affords in itself a positively-acting emergency-brake which can be safely used without endangering the operation of the device and operated by one lever.

The invention consists in the matters hereinafter described, and more fully pointed out and defined in the appended claims.

In the drawings, Figure 1 is a top plan view, partly broken away, of a device embodying our invention. Fig. 2 is a fragmentary section taken on line 2 2 of Fig. 1, showing parts in elevation. Fig. 3 is an enlarged transverse section of the driving friction-wheel. Fig. 4 is a horizontal section of the slidable bearing for the driving-shaft. Fig. 5 is a section taken on line 5 5 of Fig. 4.

As shown in said drawings, A indicates a car-frame of any preferred construction, but, as shown, comprising end sills $a\ a$ and side sills $a^4\ a^4$, between which are rigidly secured at equal distances from the center longitudinal center sills A', of wood, steel, or any preferred material. The front and rear axles $A^2\ A^3$ are journaled in bearings $a'$ of any preferred kind, secured on the longitudinal sills, the forward axle being journaled in the center sills, or both the center and side sills, as preferred. Rigidly engaged on said front axle $A^2$ between the center sills A' are inwardly-facing metallic friction-disks B B', having inwardly-directed parallel plane bearing-faces $b$ at right angles with the axis of the axle and provided with outwardly-directed elongated hubs $b'\ b'$, connecting which and the outer faces of said disks are integrally-connected ribs $b^2$, which act to prevent said disks springing laterally under the pressure of the driving friction-wheel. As shown, ball, roller, or other suitable antifriction bearings $a^2$ are secured on the axle between said hubs and the bearings $a'$ on the center sills A', which take the thrust on said friction-disks.

Rigidly engaged on the front end sill $a$ and projecting forwardly therefrom is the horizontal bracket C, shaped on its front edge to form one member of a bearing-collar, the other member of which, $c$, is shaped to correspond therewith and adapted to be rigidly bolted thereto. Carried in said collar and adapted to turn slightly therein is an engine or motor C', which may be of any preferred kind or construction. As shown, an internal-combustion engine is used comprising a flanged upright cylinder $C^2$, adapted to be air-cooled and which closely adjacent the crank-case $C^3$ is provided with a peripheral rib $c^4$, between which and the crank-case the cylinder is shaped to fit in said bearing-collar, in which it is supported on said rib $c^4$. The shaft $c'$ of said motor extends through and is journaled in both ends of the crank-case and projects rearwardly between the friction-disks B B', and the rear end thereof is journaled in a slidable bearing D, carried on the front axle between said disks and which, as shown, comprises a yoke $d$, which engages over the axle and is shorter than the distance between said disks and is provided centrally with an integral boss or projection $d'$, bored to receive the end of the engine-shaft $c'$. A slidable driving friction-wheel E of a diameter to fit loosely between said driven friction-disks B B' is splined on said shaft $c'$ and may be of any preferred construction. As shown, however, said friction-wheel comprises a plate $e$, provided on its forward side with an integral peripherally-grooved collar $e'$, and on the rear side thereof, intermediate its axis and its circumference, is provided with a rearwardly-directed annular flange $e^2$, affording a central drum adapted when said collar is at the innermost limit of its movement to receive the end of the sleeve or the projection $d'$. Secured on said central drum and extending beyond the circumference of said plate $e$ are a plurality of friction-washers $e^3$ of friction paper, leather, or any suitable material adapted to form the friction-surface of the driving friction-wheel. Said washers are rigidly secured in place by means of the annular plate or follower $e^4$, which fits over the drum or flange $e^2$ and is firmly held in binding engagement with said washers by means of the bolts $e^5$ or in any other preferred manner.

Any preferred means may be employed to throw the driving friction-wheel into and out of engagement with either of the disks B or B'; but, as shown, a hand-lever F projects through the floor of the car and is pivoted on a downwardly-extending bracket $f$, rigidly engaged on the under side of the car platform or floor $A^4$. Said lever F is provided on its lower end with a yoke or fork $f'$, which engages in a peripheral groove in the projection or bearing $d'$ at the rear end of the shaft $c'$ and acts when said lever is shifted laterally to throw the yoke $d$ longitudinally of the axle $A^2$, thus forcing the driving friction-wheel E into or out of engagement with the disks B B'. A toothed segment $f^2$ is secured on the car-floor adjacent said lever and is adapted to be engaged by the spring-controlled detent $f^3$ of any suitable kind carried on said lever and acts to lock said driving friction-wheel in its laterally-adjusted position. For the purpose of adjusting said driving friction-wheel radially of the disks B B' a hand-lever H projects downwardly through the floor and is pivoted on the lug $h$ to swing longitudinally of the car. The lower end of said lever is yoked in a familiar manner and engages in the groove in the collar $e'$ of the driving friction-wheel and acts when said lever is operated to shift said friction-wheel longitudinally of the shaft $c'$. A toothed segment $h^2$ is engaged on the floor adjacent said lever in position to be engaged by a spring-controlled detent $h^3$, carried on said lever, which holds the driving friction-wheel at any desired point of adjustment on said engine-shaft.

The operation is as follows: The thrust on the driven friction-disks B B' from the driving friction-wheel is taken upon the anti-friction-bearings, which also act to take the lateral thrust of the axle occasioned by the motion of the car. The engine or motor C' being pivotally supported upon the bracket C, the slight swing of the driving-shaft $c'$ laterally to bring the driving friction-wheel E into engagement with either of said disks does not at all affect the operation of the engine. Inasmuch as the inner end of said engine-shaft is supported in the slidable bearing D upon the axle $A^2$, a positive support is afforded the inner end of said shaft, preventing all vibration when the friction members are in driving relation, and inasmuch as said bearing is close to the application of power but little stress is brought on the engine-bearings for said shaft.

The driving friction-wheel is readily shifted, as desired, along the engine-shaft $c'$ by means of the lever H, which, as well as the lever F, is positioned conveniently to the seat X and affords a very simple and convenient means for regulating the speed, which will of course depend upon the radial adjustment of said driving friction-wheel on the driven friction-disks. Either lever may be operated as a brake, inasmuch as shifting the driving friction-wheel radially outward on the driven friction-disks acts to retard speed, while by shifting the driving-wheel from one disk to the other the driven friction member acts as a powerful brake and if continued will soon stop and reverse the car.

While we have shown our device as embodied in an inspection-car, it is obvious that it may be employed for many other purposes, and we do not purpose limiting this application for patent otherwise than necessitated by the prior act, as obviously many details of construction and application may be varied without departing from the principle of our invention.

We claim as our invention—

1. A reversible speed-transmission device comprising a driven shaft, parallel friction-disks rigidly secured thereon, a pivotally-supported motor, a driving-shaft therefrom projecting between the disks, a driving friction-wheel on said shaft, a bearing for the driving-shaft adjustably engaged on the driven shaft, and a lever adapted to swing said driving friction-wheel into engagement with either friction-disk.

2. A reversible speed-transmission device embracing a driven shaft, friction-disks rigid thereon, a pivotally-supported motor, a driving-shaft extending therefrom, a driving friction-wheel slidable thereon and positioned between the friction-disks, a bearing for the driving-shaft supported on said driven shaft, levers adapted to shift the driving friction-wheel to vary speed and direction and detents locking said levers when adjusted.

3. A reversible speed-transmission device embracing a driven shaft, friction-disks rigid thereon, a pivotally-supported motor, a driving-shaft extending therefrom, a driving friction-wheel slidable thereon and positioned between the friction-disks, levers adapted to shift the driving friction-wheel to vary speed and direction, detents locking said levers when adjusted and a sliding bearing on the driven shaft in which the end of the driving-shaft is journaled.

4. The combination with a car-frame, and one of its axles, of a motor pivotally supported on said frame, coacting means carried on said motor-shaft and said axle and operated by partly rotating the motor, acting to determine the direction of motion of the car, a bearing for said shaft slidably engaged on said axle, and means for varying the speed of drive independently of the motor rate.

5. The combination with a car and one of its axles of a motor pivotally supported on the car, a motor-shaft slidably supported at one end on the axle, disks rigidly secured on the axle, a driving friction-wheel slidable on the motor-shaft, a detent-controlled lever, acting to shift the driving friction-wheel on the motor-shaft and means adapted to swing the engine to permit the driving friction-wheel to engage either disk.

6. In a device of the class described, the combination with a car-frame, and the axle thereof, of a friction member rigidly engaged on said axle, a motor pivotally supported on the frame, a drive-shaft on said motor slidably engaged on said axle and means carried thereon adapted when said engine is turned on its pivot to engage said friction member thereby driving the car.

7. In a device of the class described, the combination with a car-frame, and the axle thereof, of a friction member rigidly engaged on said axle, a motor pivotally supported on the frame, a shaft on said motor having its inner end adjustably supported on the axle, means carried thereon adapted when said engine is turned on its pivot to engage said friction member thereby driving the car, and means acting independently of the speed of the motor acting to vary the speed of the car.

8. The combination with a car-frame and one of its axles, of a plurality of inwardly-facing friction-disks rigidly engaged on said axle, antifriction-bearings on said axle, adapted to take the longitudinal thrust of the axle, a constant-speed motor pivoted on said frame, a motor-shaft driven thereby and slidably supported at one end on the axle, a driving friction-wheel slidable on said motor-shaft and positioned between the friction-disks, locking means acting to shift said driving friction-wheel to vary speed and means adapted to lock the driving friction-wheel into engagement with either of said disks.

9. In a device of the class described the combination with a car and one of its axles, of a pair of inwardly-facing friction-disks rigidly engaged on said axle, a motor pivotally supported on the car-frame, a driving-shaft operated by said motor, means slidably engaged on the axle affording a bearing for the rear end of said shaft, a driving friction-wheel longitudinally adjustable on said motor-shaft and means acting to throw the same into and out of engagement with said disks.

10. In a device of the class described the combination with a vehicle-frame, and one of its axles, of a pair of inwardly-facing friction-disks rigidly engaged on said axle, a constant-speed motor pivotally engaged on said frame, a driving-shaft operated thereby adapted to swing in the arc of a circle, a driving friction-wheel slidably engaged thereon a lever pivoted on said frame adapted to move said friction-wheel longitudinally of its shaft, a bearing-yoke on the rear end of said shaft adapted to engage the axle and a lever engaged on said yoke adapted to move said driving friction-wheel laterally into engagement with either disk.

In testimony whereof we have hereunto subscribed our names in the presence of two subscribing witnesses.

GEORGE W. MARBLE.
WILLIAM R. DONALDSON.

Witnesses:
  W. W. WITHENBURY,
  H. S. RUDD.